(12) United States Patent
Imabayashi

(10) Patent No.: US 11,288,381 B2
(45) Date of Patent: Mar. 29, 2022

(54) CALCULATION DEVICE, CALCULATION METHOD, CALCULATION PROGRAM AND CALCULATION SYSTEM

(71) Applicant: EAGLYS Inc., Tokyo (JP)

(72) Inventor: Hiroki Imabayashi, Tokyo (JP)

(73) Assignee: EAGLYS Inc., Tokyo (JP)

(*) Notice: Subject to any disclaimer, the term of this patent is extended or adjusted under 35 U.S.C. 154(b) by 0 days.

(21) Appl. No.: 17/274,437

(22) PCT Filed: May 22, 2020

(86) PCT No.: PCT/JP2020/020228
§ 371 (c)(1),
(2) Date: Mar. 9, 2021

(87) PCT Pub. No.: WO2021/014733
PCT Pub. Date: Jan. 28, 2021

(65) Prior Publication Data
US 2021/0248245 A1 Aug. 12, 2021

(30) Foreign Application Priority Data
Jul. 19, 2019 (JP) .............................. JP2019-133973

(51) Int. Cl.
*G06F 21/60* (2013.01)
*G06F 9/455* (2018.01)
(Continued)

(52) U.S. Cl.
CPC ............ *G06F 21/602* (2013.01); *G06F 9/455* (2013.01); *G06F 21/31* (2013.01); *G06F 21/62* (2013.01);
(Continued)

(58) Field of Classification Search
CPC .......... G06F 9/455; G06F 21/31; G06F 21/62; H04L 9/0819; H04L 9/0894; H04L 9/008; H04L 2209/12
See application file for complete search history.

(56) References Cited

U.S. PATENT DOCUMENTS 9,189,609 B1 * 11/2015 Antony ................. G06F 21/575
10,154,015 B1 * 12/2018 Lerner .................. H04L 9/0894
(Continued)

FOREIGN PATENT DOCUMENTS

| JP | 2003-256234 A | 9/2003 |
| JP | 2004-531914 A | 10/2004 |

(Continued)

OTHER PUBLICATIONS

International Search Report for PCT/JP2020/020228 dated Sep. 8, 2020.
(Continued)

*Primary Examiner* — J. Brant Murphy
*Assistant Examiner* — Stephen T Gundry
(74) *Attorney, Agent, or Firm* — Yokoi & Co., U.S.A.; Toshiyuki Yokoi

(57) ABSTRACT

Provided with a calculation device for performing a calculation for an encryption data in a virtual execution environment protected from a standard execution environment, the calculation device has a virtual execution environment construction unit for constructing the virtual execution environment, and the virtual execution environment includes: an encryption data acquisition unit for acquiring the encryption data; a source code acquisition unit for acquiring a source code for the calculation; a key acquisition unit for acquiring the system key; a decryption unit for decrypting the encryption data by the acquired system key; a source code execution unit for executing the source code; an encryption unit
(Continued)

for encrypting a calculation result to which the source code is executed by the system key; and a calculation result providing unit for providing the encrypted calculation result to the standard execution environment.

11 Claims, 8 Drawing Sheets

(51) Int. Cl.
    *G06F 21/31*    (2013.01)
    *G06F 21/62*    (2013.01)
    *H04L 9/08*    (2006.01)
    *H04L 9/00*    (2022.01)

(52) U.S. Cl.
    CPC .......... *H04L 9/0819* (2013.01); *H04L 9/0894* (2013.01); *H04L 9/008* (2013.01); *H04L 2209/12* (2013.01)

(56) References Cited

U.S. PATENT DOCUMENTS

| | | | |
|---|---|---|---|
| 2003/0172305 A1 | 9/2003 | Miwa | |
| 2005/0050317 A1 | 3/2005 | Kramer et al. | |
| 2006/0015748 A1* | 1/2006 | Goto | G06F 21/554 |
| | | | 713/190 |
| 2006/0112342 A1 | 5/2006 | Bantz et al. | |
| 2010/0122343 A1 | 5/2010 | Ghosh et al. | |
| 2011/0302415 A1 | 12/2011 | Ahmad et al. | |
| 2013/0003582 A1* | 1/2013 | Park | H04L 63/08 |
| | | | 370/252 |
| 2013/0007889 A1* | 1/2013 | McCloy | G06F 8/71 |
| | | | 726/26 |
| 2013/0061059 A1* | 3/2013 | Tashiro | G06F 21/606 |
| | | | 713/189 |
| 2014/0096134 A1 | 4/2014 | Barak et al. | |
| 2015/0046405 A1* | 2/2015 | Brueckner | G06F 11/1469 |
| | | | 707/684 |
| 2015/0143374 A1* | 5/2015 | Banga | G06F 9/5077 |
| | | | 718/1 |
| 2015/0193637 A1* | 7/2015 | Booth | G06F 21/53 |
| | | | 726/30 |
| 2015/0229619 A1 | 8/2015 | Costa et al. | |
| 2015/0309831 A1 | 10/2015 | Powers et al. | |
| 2016/0308858 A1 | 10/2016 | Nordstrom et al. | |
| 2017/0104767 A1 | 4/2017 | Ferris et al. | |
| 2017/0279601 A1* | 9/2017 | Yamane | G06F 21/56 |
| 2017/0288854 A1* | 10/2017 | Yamane | H04L 63/0428 |
| 2017/0323098 A1* | 11/2017 | Denier | G06F 21/64 |
| 2018/0019983 A1* | 1/2018 | Tissot | G06F 21/62 |
| 2018/0046823 A1* | 2/2018 | Durham | H04L 63/06 |
| 2018/0082078 A1* | 3/2018 | Suzuki | G06F 21/62 |
| 2019/0163910 A1* | 5/2019 | Moon | G06F 21/572 |
| 2019/0207813 A1* | 7/2019 | Uehara | H04L 9/0643 |
| 2019/0268149 A1* | 8/2019 | Kariv | H04L 63/20 |
| 2020/0004969 A1* | 1/2020 | Benke | G06F 21/6245 |
| 2020/0012527 A1* | 1/2020 | Hartsock | H04L 9/0894 |
| 2020/0134200 A1* | 4/2020 | Williams | G06F 21/602 |
| 2020/0225972 A1* | 7/2020 | Karunaratne | G06F 9/45558 |
| 2020/0366459 A1* | 11/2020 | Nandakumar | G06N 3/084 |

FOREIGN PATENT DOCUMENTS

| | | |
|---|---|---|
| JP | 2011-48661 A | 3/2011 |
| JP | 2013-58006 A | 3/2013 |
| JP | 2013-528872 A | 7/2013 |
| JP | 2015-143890 A | 8/2015 |
| JP | 2018-518738 A | 7/2018 |
| WO | 2019/060843 A | 3/2019 |

OTHER PUBLICATIONS

PCT written opinion dated Sep. 8, 2020.
Masashi Une, et al. "Research trends on vulnerability and countermeasures in machine learning systems, Proceedings of Computer Security Symposium 2018", Oct. 15, 2018, 2.1 Configuration of machine learning system, 2.3 Direction of attacks and countermeasures (2) Communication path between entities.
Yukihiro Katsumura "Basic knowledge of service and technology to be known, True identity of Cloud?" Nikkei Personal Computing, Sep. 26, 2011, No. 634, pp. 74-83, pp. 82 right column—pp. 83 left column, Fig. 2.
Extended European Search Report dated Dec. 20, 2021.

\* cited by examiner

CALCULATION DEVICE, CALCULATION METHOD, CALCULATION PROGRAM AND CALCULATION SYSTEM

TECHNICAL FIELD

The present disclosure relates to a calculation device, a calculation method, a calculation program and a calculation system.

BACKGROUND ART

In the situation where secret data such as personal information is managed on a cloud server, in order to utilize information while preventing information leakage from the cloud server, an encryption technology capable of storing the data on the cloud server in a state that the data is preliminarily encrypted and performing a calculation in the encrypted state when using an encryption data stored in the cloud server is conventionally known. For example, Patent Document 1 discloses secure computing technology based on public key encryption using a cryptographic function having a homomorphic property to addition and subtraction and capable of performing the calculation of addition, subtraction, multiplication and division in the encrypted state.

PRIOR ART DOCUMENTS

Patent Documents

Patent Document 1: Japanese Patent Application Laid-Open No. 2011-227193

DISCLOSURE OF THE INVENTION

Problems to be Solved by the Invention

When the homomorphic encryption scheme is used as shown in Patent Document 1, the encrypted text of the calculation result after addition and subtraction can be acquired by adding or subtracting the encrypted text without decrypting the encrypted text. However, the encrypted text encrypted by the cryptographic function having a homomorphic property has an extremely large size although reliability is high. Thus, the calculation amount is enormous and it is not easy to apply it for a practically used system.

Accordingly, the present disclosure is made for solving the above described problem and the purpose of the present disclosure is to provide a calculation device (arithmetic device) capable of calculating the encrypted data efficiently.

Means for Solving the Problem

In order to achieve the above described purpose, a calculation device concerning the present disclosure is a calculation device for performing a calculation for an encryption data in a virtual execution environment protected from a standard execution environment, the calculation device has a virtual execution environment construction unit for constructing the virtual execution environment, and the virtual execution environment includes: an encryption data acquisition unit for acquiring the encryption data; a source code acquisition unit for acquiring a source code for the calculation; a key acquisition unit for acquiring the system key; a decryption unit for decrypting the encryption data by the acquired system key; a source code execution unit for executing the source code to the decrypted encryption data; an encryption unit for encrypting a calculation result to which the source code is executed by the system key; and a calculation result providing unit for providing the encrypted calculation result to the standard execution environment.

In order to achieve the above described purpose, a calculation system concerning the present disclosure is a calculation system for performing a calculation for an encryption data in a virtual execution environment protected from a standard execution environment, the calculation system has a virtual execution environment construction unit for constructing the virtual execution environment, and the virtual execution environment includes: an encryption data acquisition unit for acquiring the encryption data; a source code acquisition unit for acquiring a source code for the calculation; a key acquisition unit for acquiring the system key; a decryption unit for decrypting the encryption data by the acquired system key; a source code execution unit for executing the source code to the decrypted encryption data; an encryption unit for encrypting a calculation result to which the source code is executed by the system key; and a calculation result providing unit for providing the encrypted calculation result to the standard execution environment.

In addition, in order to achieve the above described purpose, a calculation method concerning the present disclosure is a calculation method for performing a calculation for an encryption data in a virtual execution environment protected from a standard execution environment, the method is executed by a computer having a controller and has a step of constructing the virtual execution environment by the controller, and the controller executes the following steps in the virtual execution environment: a step of acquiring the encryption data; a step of acquiring a source code for the calculation; a step of acquiring the system key; a step of decrypting the encryption data by the acquired system key; a step of executing the source code to the decrypted encryption data; a step of encrypting a calculation result to which the source code is executed by the system key; and a step of providing the encrypted calculation result to the standard execution environment.

In addition, in order to achieve the above described purpose, a calculation program concerning the present disclosure makes the computer execute the above described calculation method.

Effects of the Invention

By using the present disclosure, the encrypted data can be calculated efficiently.

MODES FOR CARRYING OUT THE INVENTION

Hereafter, the embodiments of the present disclosure will be explained with reference to the drawings. In all drawings explaining the embodiments, the same reference signs are assigned to the common component to omit the repeated explanation. Note that the following embodiments do not unreasonably limit the content of the present disclosure described in the claims. In addition, all components disclosed in the embodiments are not necessarily essential components of the present disclosure.

First Example (Configuration of Information Processing System 1)

Figure 1:
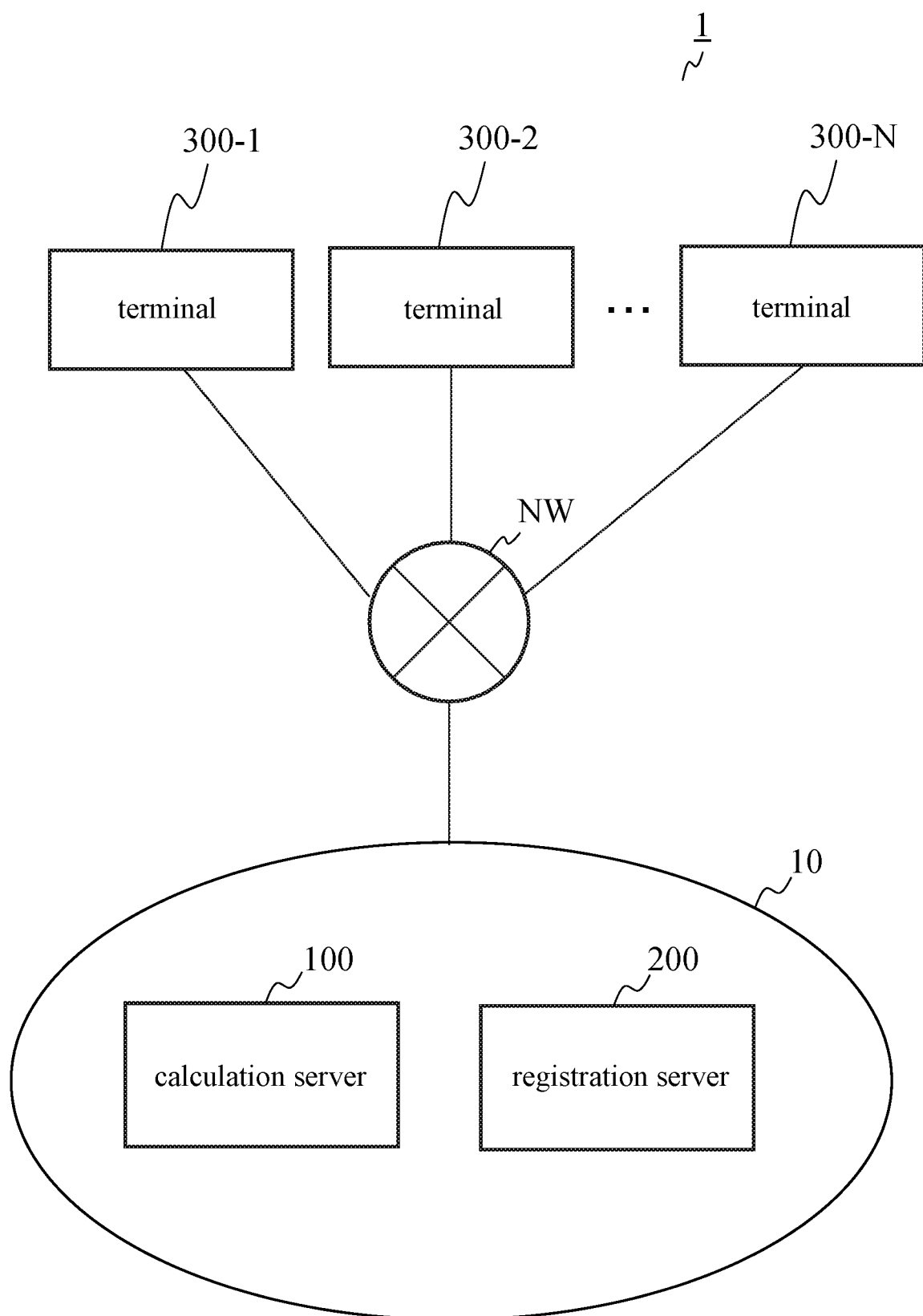
FIG. 1 is a drawing showing a configuration of an information processing system 1.

FIG. 1 is a drawing showing a configuration of an information processing system 1 of the present embodiment. The configuration of the information processing system 1 concerning the first embodiment will be explained with reference to FIG. 1.

The information processing system 1 has a data center 10 and terminals 300-1, 300-2, - - - , 300-N (N is natural number) and they are communicatively connected with each other via a network NW. The network NW is, for example, WAN (Wide Area Network), LAN (Local Area Network) or the like. However, the network NW can be comprised of arbitrary network. Note that the terminals 300-1, 300-2, - - - , 300-N are referred to as a terminal 300 in the following explanation unless they should be particularly distinguished. In addition, although the data center 10 is connected with the terminal 300 or the like via the network NW in the present embodiment, the configuration is not limited to the above described configuration. The information processing system 1 can have the terminal 300 or the like locally connected with the data center 10.

The data center 10 provides a calculation process to a user or the like who uses the information processing system 1. The data center 10 has a calculation server 100 and a registration server 200. The calculation server 100 corresponds to the calculation device for performing a calculation for an encryption data. The calculation server 100 performs a calculation for the encryption data in accordance with a calculation processing request received from the terminal 300 or the like connected with the network NW. The registration server 200 performs a preliminary registration process for enabling the above described user to use the information processing system 1.

The terminal 300 is an information processing device used by the above described user. The terminal 300 is, for example, a PC (Personal Computer), a smart phone, a tablet terminal, a wearable terminal such as a head mount display, an AR (Augmented Reality) device, a VR (Virtual Reality) device and an MR (Mixed Reality) device. The terminal 300 applies for utilization to the registration server 200 and requests the calculation process to the calculation server 100.

(Function Configuration of Calculation Server 100)

Figure 2:
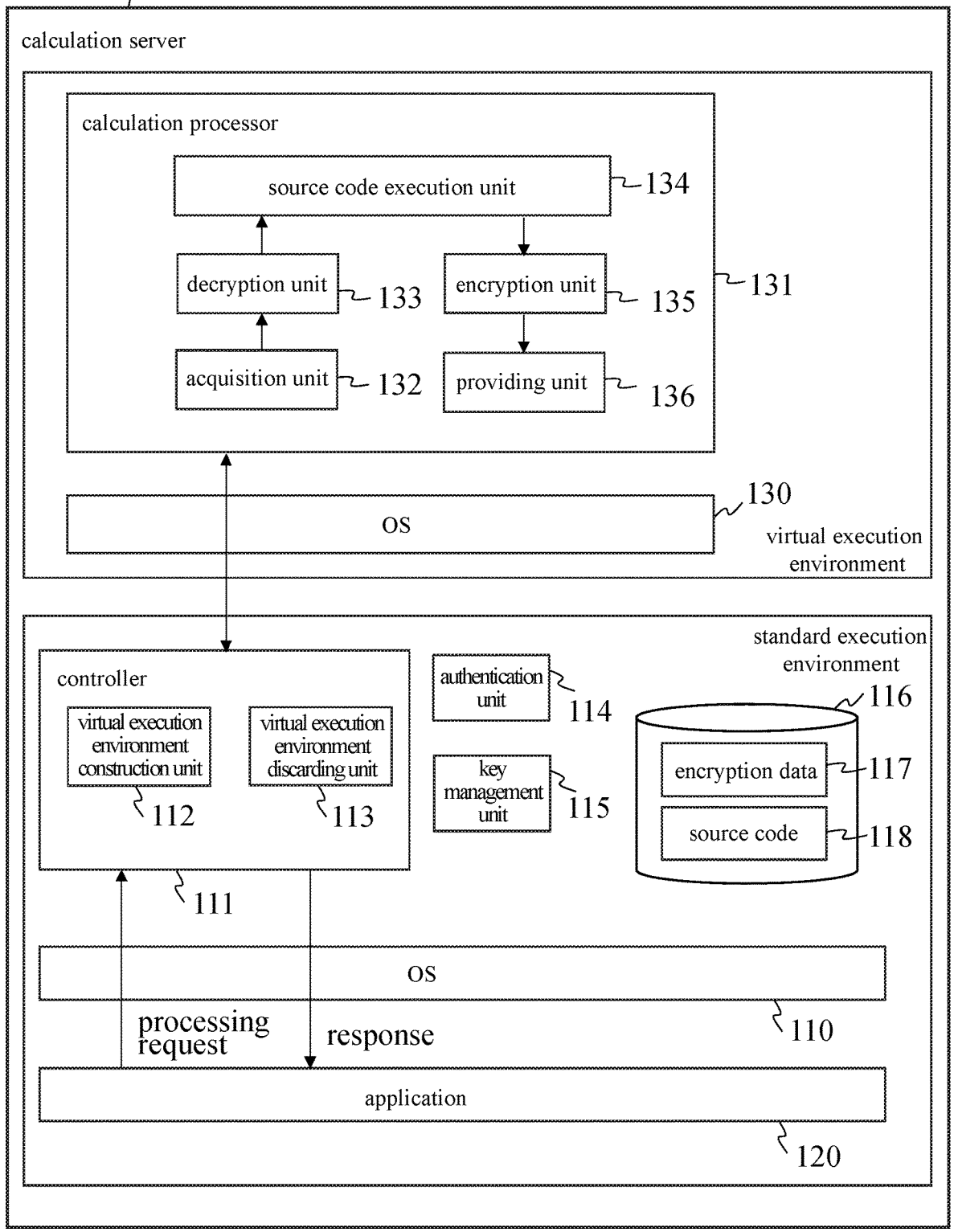
FIG. 2 is a functional block diagram showing an example of a function configuration of a calculation server 100.

FIG. 2 is a functional block diagram showing an example of a function configuration of the calculation server 100. An example of the function configuration of the calculation server 100 will be explained with reference to FIG. 2.

The calculation server 100 is equipped with an OS (Operating System) 110, and an application 120 is operated on the OS 110. The OS 110 has a controller 111, an authentication unit 114, a key management unit 115 and a storage unit 116. Here, in the OS 110, the programs installed in the OS and the environment used for executing the applications or the like are referred to as "standard execution environment."

The controller 111 has a virtual execution environment construction unit 112 and a virtual execution environment discarding unit 113. The controller 111 performs a calculation process by receiving the calculation processing request for a later described encryption data 117 from the application 120 using the encryption data 117.

The virtual execution environment construction unit 112 constructs a virtual execution environment protected from the standard execution environment in accordance with the calculation processing request. Namely, only the authenticated user can access the virtual execution environment from the standard execution environment. Although the virtual execution environment is implemented as a part of the OS 110 in the present embodiment, the method for constructing the virtual execution environment is not particularly limited. The virtual execution environment can be implemented as an application or implemented as a module in the application. In addition, the virtual execution environment can share the memory portion of the hardware with the standard execution environment, although it is also possible not to share the memory portion. Although the virtual execution environment is substantially expressed as a predetermined data, the virtual execution environment can be used as a virtualized application server or the like when executed on the OS 110.

The virtual execution environment discarding unit 113 discards (eliminates) the above described virtual execution environment. For example, the virtual execution environment is discarded by deleting a predetermined data expressing the virtual execution environment. The virtual execution environment discarding unit 113 can discard the virtual execution environment when a predetermined time elapses after a later described source code execution unit 134 starts executing the source code. Alternatively, the virtual execution environment discarding unit 113 can discard the virtual execution environment after a later described providing unit 136 provides the encrypted calculation result. Alternatively, the virtual execution environment discarding unit 113 can discard the virtual execution environment in accordance with an instruction from the user authenticated by a later described authentication unit 114. Alternatively, the virtual execution environment can be discarded at a predetermined periodical timing. Note that the time (period) until discarding the virtual execution environment is preferably between several seconds and several minutes. However, the time (period) can be appropriately determined depending on the processing amount or the like.

Namely, the virtual execution environment for performing the calculation for the encryption data by executing the source code is a one-time (disposable) execution environment. Even when the access to the execution environment is limited, a hacker (e.g., unauthenticated, illegal user) can easily access the execution environment if sufficient time is given. Therefore, in the present embodiment, the calculation is performed in the one-time virtual execution environment. Thus, the risk of being accessed by a hacker is reduced, and security is improved.

The authentication unit 114 authenticates whether or not the user is a secure user who can securely access the virtual execution environment. For example, the authentication unit 114 has an authorization database for storing the identification information (ID) for identifying the user and the authentication information in association with each other. Thus, the authentication unit 114 authenticates the user registered for using the information processing system 1 (i.e., the user who has finished the use registration). Note that the authentication information can be changed based on the intention of the user. Alternatively, the authentication information can be changed per a predetermined period. In addition, the authentication information can be a one-time password (One Time Password: OTP) which is updated per a predetermined period or updated each time when the virtual execution environment is constructed. The OTP is generated from random numbers, characters, symbols and the like calculated by a function depending on the time, for example. However, the method is not limited to the above described method. The OTP can be generated by other methods. The OTP can be transmitted from the authentication unit 114 to an e-mail address or an SNS (Short Message Service) of the user each time when the authentication is requested by the user, for example. In this case, the OPS cannot be acquired unless the user has a browsing authority for browsing the e-mail or the SNS. Thus, the security can be further improved.

The key management unit 115 has a key database for storing the ID of the user and the system key used for encrypting the data in the information processing system 1 in association with each other. The key management unit 115 can generate the system key and register the system key in the key database when the use registration is executed by the user, for example. Note that the key management unit 115 can be provided on the OS different from the OS 110 in the calculation server 100. In addition, the system key can be generated at the user side via the network NW and registered in the key database of the key management unit 115 by the method in which security is secured. The method in which security is secured is not limited to the method of using the conventionally known technology such as a public key algorithm, for example. The documents or face to face communication can be also used.

The storage unit 116 stores encryption data 117 and source code 118. The encryption data 117 is the data encrypted by the above described system key. In the present embodiment, the data to be encrypted is the data such as personal information requiring the consideration in terms of privacy, for example. However, the data to be encrypted is not limited to the above described data. For example, the data generated to include the encrypted data or any data can be encrypted.

The source code 118 is a source code used for the calculation. The source code 118 is a program for executing the calculation for the data generated by decrypting the encryption data 117 by using the system key. The encryption data 117 and the source code 118 can be transmitted from the terminal 300 to the calculation server 100 via the network NW. Alternatively, the encryption data 117 and the source code 118 can be acquired from a storage medium or the like. Alternatively, the encryption data 117 and the source code 118 can be preliminarily stored in the storage unit 116.

The source code 118 can be an algorithm for generating a learning model based on the encryption data 117. For example, a correlation or the like is extracted for the decrypted encryption data 117 and a learning model is generated as a calculation result.

The application 120 is an application working on the OS 110. For example, the application 120 analyzes and cryptanalyzes the encrypted data. When the application 120 invokes (calls) a calculation API (Application Program Interface), the calculation processing request is outputted to the controller 111. The virtual execution environment construction unit 112 of the controller 111 constructs the above described virtual execution environment in accordance with the calculation processing request.

The virtual execution environment is equipped with an OS 130. The OS 130 has a calculation processor 131. The controller 111 forms a secure communication channel between the OS 110 and the OS 130. For example, the virtual execution environment can be constructed so that the virtual execution environment preliminarily includes a session key for encrypting the data transmitted and received between the OS 110 and the OS 130. Alternatively, the session key generated in the OS 130 or the OS 110 can be shared by using the conventionally known technology such as a public key algorithm. In the present embodiment, the data is transmitted and received between the OS 110 and the OS 130 through the above described secure communication channel. However, it is possible not to encrypt the already encrypted data by using the session key. Consequently, the burden of the process can be reduced.

The calculation processor 131 is a calculation program installed in the OS 130, for example. The calculation processor 131 includes an acquisition unit 132, a decryption unit 133, a source code execution unit 134, an encryption unit 135 and a providing unit 136.

The acquisition unit 132 corresponds to an encryption data acquisition unit, a source code acquisition unit and a key acquisition unit. The acquisition unit 132 acquires the encryption data 117 and the source code 118 from the storage unit 116 and acquires the system key from the key management unit 115.

The decryption unit 133 decrypts the encryption data 117 by using the system key acquired by the acquisition unit 132.

The source code execution unit 134 executes the source code 118 to the decrypted encryption data 117.

The encryption unit 135 encrypts the calculation result executed by the source code execution unit 134. The encryption unit 135 can encrypt the calculation result by using the system key acquired by the acquisition unit 132. Alternatively, the encryption unit 135 can encrypt the calculation result by using a different key different from the system key instead of the system key. For example, the key management unit 115 can generate the system key and a different key (system key) which is different from the system key, and the acquisition unit 132 can acquire these keys and transmit these keys to the encryption unit 135. In addition, the acquisition unit 132 can acquire a different key which is different from the system key generated in a key generation unit (not shown in FIG. 2) of the calculation processor 131 and transmit the different key to the encryption unit 135. Consequently, the access authority to the calculation result can be managed by giving the above described different key only to the user permitted to access the calculation result, for example.

The providing unit 136 provides the encrypted calculation result to the standard execution environment, or the like. For example, the encrypted calculation result can be stored in the storage unit 116. Alternatively, the encrypted calculation result can be outputted to the application 120 as a response to the processing request. Note that the providing unit 136 can provide a different key (system key) which is different from the system key generated in the above described key generation unit to the standard execution environment.

After the encrypted calculation result is provided, the virtual execution environment is discarded. Note that although the virtual execution environment discarding unit 113 is provided on the OS 110 in the present invention, the virtual execution environment discarding unit 113 can be provided on the OS 130 instead of the OS 110. Alternatively, the virtual execution environment discarding unit 113 can be provided on the OS 110 and the OS 130.

As described above, in the calculation process of the present embodiment, when the application 120 invokes the calculation API, the virtual execution environment construction unit 112 of the controller 111 constructs the virtual execution environment protected from the standard execution environment and entrusts the calculation process for the encryption data to the calculation processor 131 of the OS 130. The calculation processor 131 decrypts the encryption data, performs the calculation on the decrypted encryption data, encrypts the calculation result, and provides the encrypted calculation result to the standard execution environment. Since the calculation process is performed for the decrypted encryption data (raw data), processing efficiency can be improved compared to the calculation using the homomorphic encryption or the like in which the calculation can be performed in the encrypted state. In addition, since the data is decrypted and the calculation process is performed in the virtual execution environment protected from the standard execution environment, the access from the unauthenticated user can be prevented and the security is ensured.

In addition, since the virtual execution environment is a one-time (disposable) execution environment which is discarded in a predetermined timing after the source code is executed, the risk of the illegal acquisition of the encryption key is reduced by preventing the attack to the OS 130 which is the virtual execution environment and the security can be improved. In addition, since the construction of the virtual execution environment of the present embodiment can be achieved only by a software technology, additional hardware is not required and the operation cost can be reduced.

(Function Configuration of Registration Server 200)

Figure 3:
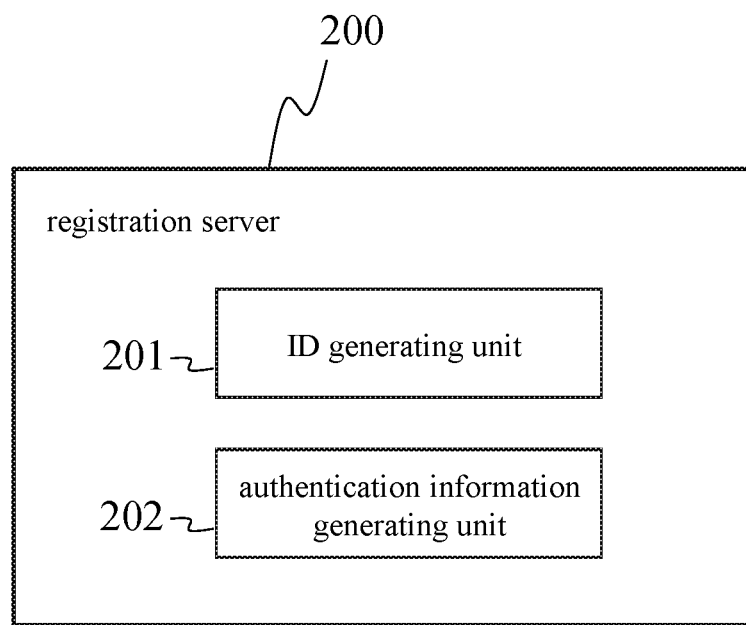
FIG. 3 is a functional block diagram showing an example of a function configuration of a registration server 200.

FIG. 3 is a functional block diagram showing an example of a function configuration of the registration server 200. An example of the function configuration of the registration server 200 will be explained with reference to FIG. 3.

The registration server 200 has an ID generating unit 201 and an authentication information generating unit 202. The ID generating unit 201 generates an identification information (ID) for identifying the user in accordance with a utilization application of the user. The authentication information generating unit 202 generates the authentication information of the user. For example, a password is generated as the authentication information by a random number generator or the like.

(Process in Registration Server 200)

Figure 4:
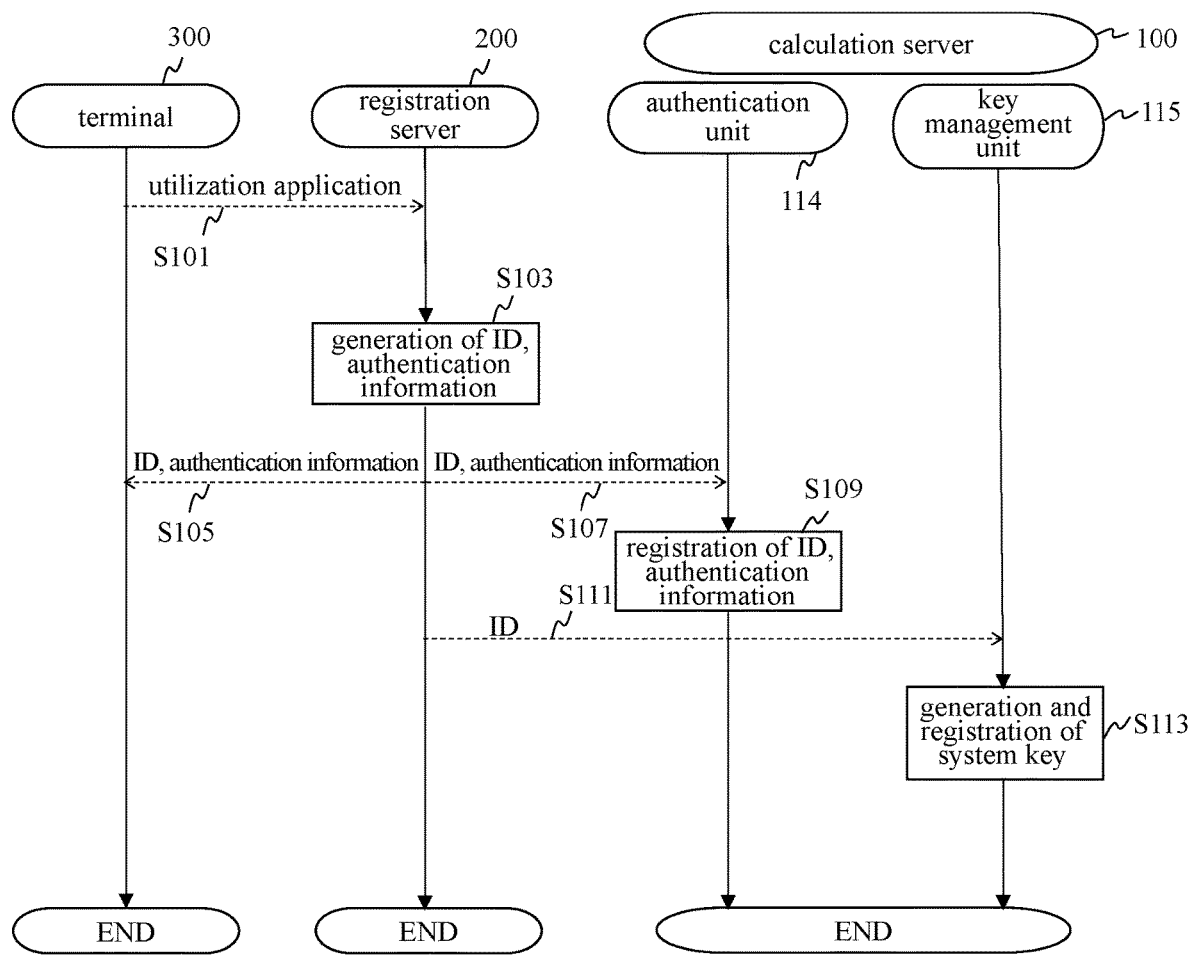
FIG. 4 is a sequence diagram showing an example of the process in the registration server 200.

FIG. 4 is a sequence diagram showing an example of the process in the registration server 200. The use registration process to the information processing system 1 of the present embodiment will be explained with reference to FIG. 4. Note that the use registration is performed by the method in which security is secured as explained above in the terminal 300, the registration server 200 and the calculation server 100.

In Step S101, the terminal 300 applies for utilization to the registration server 200.

In Step S103, the registration server 200 generates the ID for identifying the user and the authentication information.

In Step S105, the terminal 300 acquires the ID and the authentication information generated in Step S103. For example, the terminal 300 can receive the ID and the authentication information from an operating company of the information processing system 1 by a written document. Alternatively, the terminal 300 can receive the ID and the authentication information by using the conventionally known technology such as a public key algorithm.

In Step S107, the authentication unit 114 of the calculation server 100 acquires the ID and the authentication information by the method in which security is secured similar to Step S105.

In Step S109, the authentication unit 114 registers the ID and the authentication information in the authorization database in association with each other.

In Step S111, the key management unit 115 acquires the ID of the user.

In Step S113, the key management unit 115 generates the system key corresponding to the ID of the user and registers the ID and the system key in the key database in association with each other.

(Authentication Process in Calculation Server 100)

Figure 5:
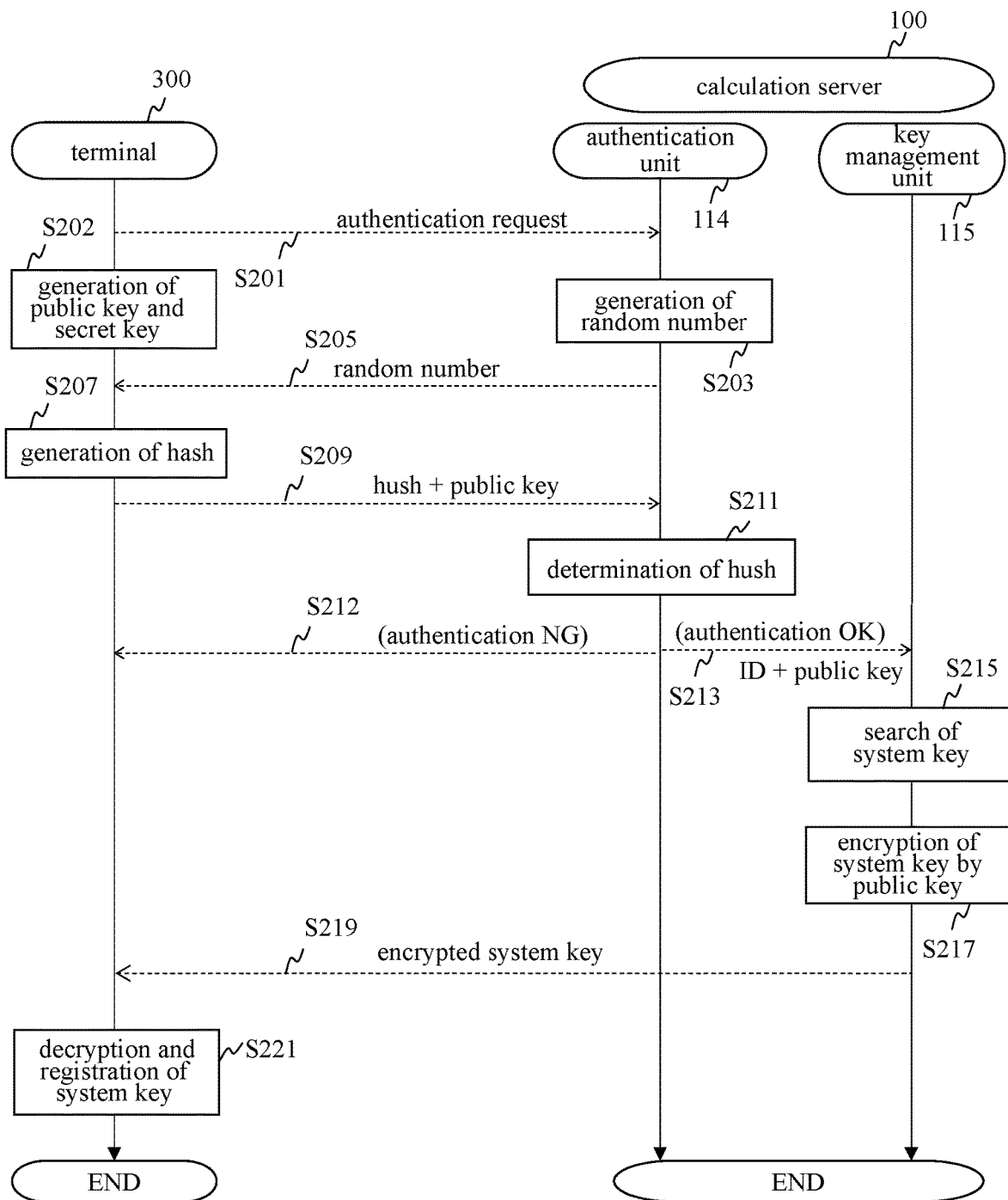
FIG. 5 is a sequence diagram showing an example of an authentication process in the calculation server 100.

FIG. 5 is a sequence diagram showing an example of the authentication process in the calculation server 100. The authentication process in the calculation server 100 will be explained with reference to FIG. 5. Note that the order of the processing steps shown in FIG. 5 is merely an example. In addition, it goes without saying that the authentication method and sharing method of the system key are not limited to the method explained below.

In Step S201, the terminal 300 transmits the ID of the user who uses the terminal 300 to the calculation server 100 together with an authentication request. In addition, in Step S202, the terminal 300 generates own public key and secret key.

In Step S203, the authentication unit 114 generates a random number in accordance with the authentication request. In Step S205, the authentication unit 114 transmits the random number to the terminal 300.

In Step S207, the terminal 300 generates a hash by connecting the received random number and the authentication information acquired by the above described use registration.

In Step S209, the terminal 300 transmits the information including the generated hush and public key to the authentication unit 114.

In Step S211, the authentication unit 114 reads the authentication information corresponding to the ID received together with the authentication request in Step S201 and generates the hush by connecting the read authentication information and the random number generated in Step S203. Then, the authentication unit 114 determines whether or not the hush received from the terminal 300 is identical to the hush generated by the authentication unit 114.

When the hush is not identical, the authentication unit 114 determines that the user who requested authentication is the unregistered user and informs the fact that the authentication is failed in Step S212. On the other hand, when the hush is identical, the authentication unit 114 determines that the user who requested authentication is the authenticated user and transmits the ID of the user and the public key received in Step S209 to the key management unit 115 in Step S213.

In Step S215, the key management unit 115 searches the system key corresponding to the ID in the key database.

In Step S217, the key management unit 115 encrypts the searched system key by the public key received in Step S213. In Step S219, the key management unit 115 transmits the encrypted system key to the terminal 300.

In Step S221, the terminal 300 decrypts the encrypted system key by using the secret key generated in Step S202 and registers the system key. The terminal 300 encrypts the data treated when requesting the calculation process in the calculation server 100 by using the system key in the information processing system 1.

Note that although the system key is generated by the key management unit 115 in the present embodiment, the system key can be generated at the terminal 300 side and shared with the key management unit 115.

(Calculation Process in Calculation Server 100)

Figure 6:
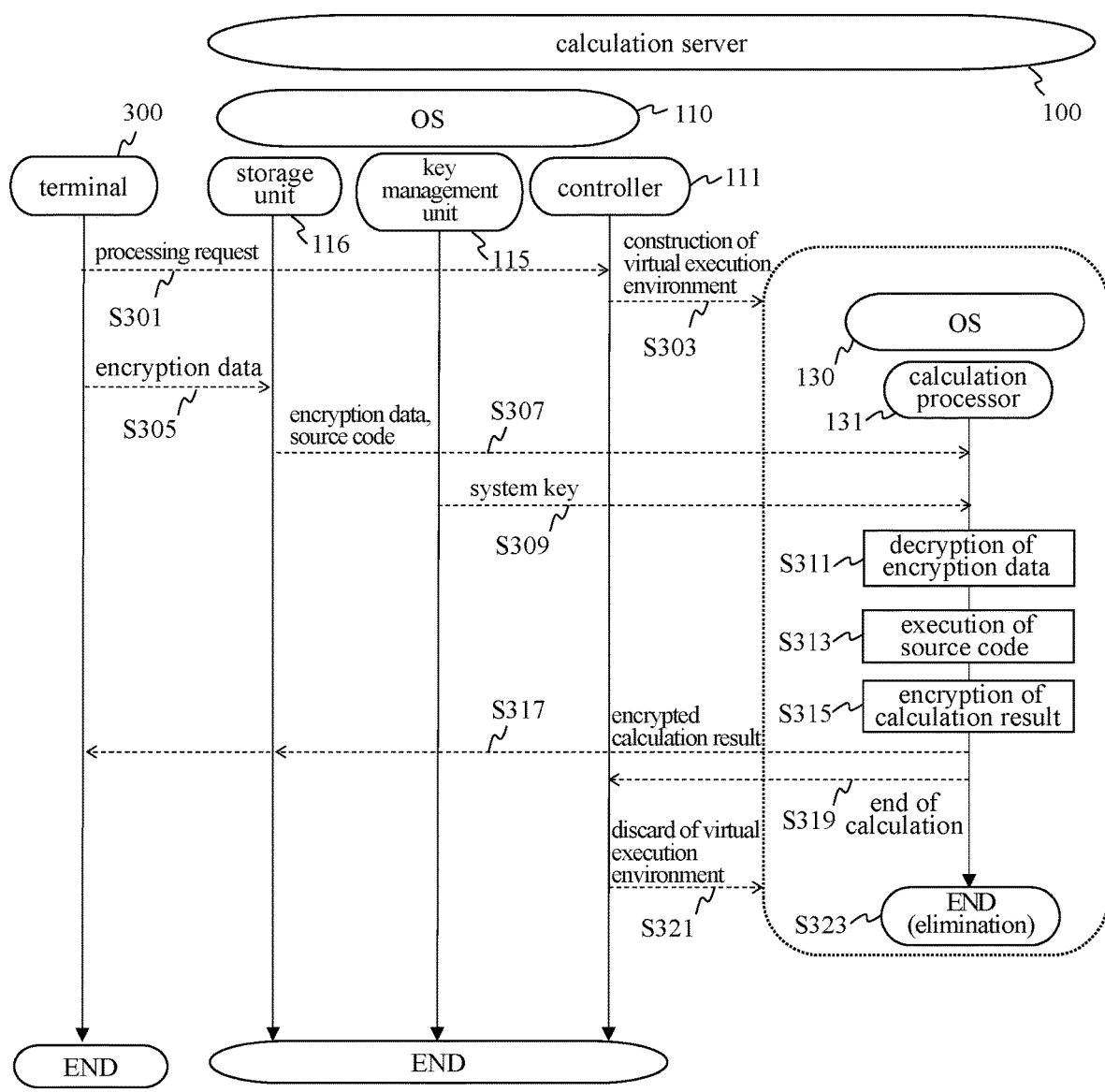
FIG. 6 is a sequence diagram showing an example of a calculation process in the calculation server 100.

FIG. 6 is a sequence diagram showing an example of the calculation process in the calculation server 100. The calculation process in the calculation server 100 will be explained with reference to FIG. 6. Note that the order of the processing steps shown in FIG. 6 is merely an example. It goes without saying that the calculation process is not limited to the processing steps explained below. In FIG. 6, the terminal 300 is the terminal 300 authenticated by the steps shown in FIG. 5.

In Step S301, the terminal 300 requests a calculation processing (processing request of calculation) to the calculation server 100. For example, the terminal 300 invokes the calculation API and requests the calculation processing to the controller 111. Note that the processing can be requested from the application operated on the OS 110.

In Step S303, the controller 111 constructs the virtual execution environment in accordance with the processing request.

In Step S305, the terminal 300 transmits the encryption data to the calculation server 100 and the storage unit 116 stores the encryption data. Note that the source code is preliminarily stored in the storage unit 116 in the example shown in FIG. 6.

In Step S307, the calculation processor 131 acquires the encryption data and the source code from the storage unit 116.

In Step S309, the calculation processor 131 acquires the system key from the key management unit 115.

In Step S311, the calculation processor 131 decrypts the encryption data by using the system key. In Step S313, the calculation processor 131 executes the source code to the decrypted encryption data.

In Step S315, the calculation processor 131 encrypts the calculation result to which the source code is executed by using the system key. In Step S317, the encrypted calculation result is transmitted to the terminal 300. Note that the encrypted calculation result can be stored in the storage unit 116.

In Step S319, the calculation processor 131 notifies the controller 111 that the encrypted calculation result is provided.

In Step S321, the controller 111 discards the virtual execution environment in Step S319 in accordance with the reception of the notification notifying that the encrypted calculation result has already provided.

(Hardware Configuration Diagram)

Figure 7:
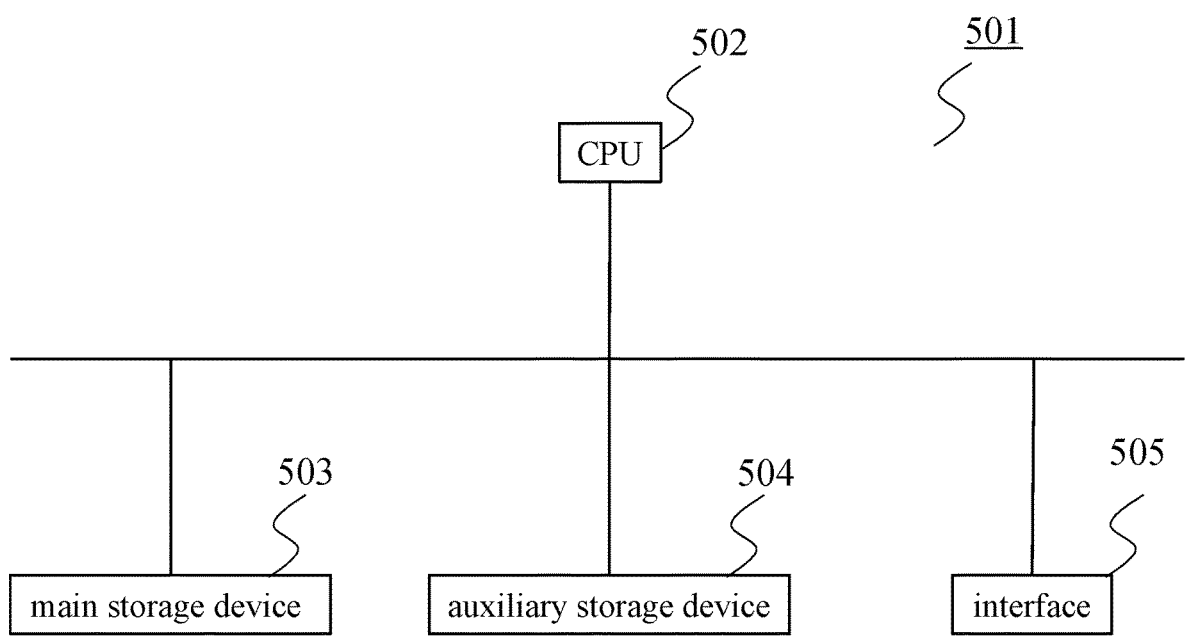
FIG. 7 is a block diagram showing a hardware configuration of the calculation server 100.

FIG. 7 is a block diagram showing the hardware configuration of the calculation server 100. The calculation server 100 is implemented on a computer 501. The computer 501 has a CPU 502, a main storage device 503, an auxiliary storage device 504 and an interface 505.

The operations of components of the calculation server 100 are stored in the auxiliary storage device 504 as a format of the program. The CPU 502 reads the programs from the auxiliary storage device 504, expands the programs to the main storage device 503 and executes the above described processes in accordance with the programs. In addition, the CPU 502 secures a storage area in the main storage device 503 in accordance with the programs. Specifically, the programs are the programs for performing the calculation for the encryption data in the computer 501.

Note that the auxiliary storage device 504 is an example of a non-temporary concrete medium. Other examples of the non-temporary concrete medium can be a magnetic disk, a magneto optic disk, a CD-ROM, a DVD-ROM and a semiconductor memory which are connected via the interface 505. In addition, when the programs are distributed to the computer 501 via the network, the computer 501 that receives the programs can extract the programs in the main storage device 503 and execute the processes.

In addition, the programs can be prepared for achieving only a part of the above described functions. Furthermore, the programs can be a so-called difference file (difference program) for achieving the above described functions while combined with the other programs already stored in the auxiliary storage device 504. Note that the hardware configuration shown in FIG. 7 can be used also for the registration server 200 and the terminal 300. Same as the above described calculation server 100, the operations of components of the registration server 200 and the terminal 300 are also achieved by the CPU which is operated in accordance with the programs stored in the auxiliary storage device.

(Explanation of Effect)

As described above, in the present embodiment, the virtual execution environment protected from the standard execution environment is constructed, and the calculation process for the encryption data is executed in the virtual execution environment. In the virtual execution environment, the encryption data is decrypted and the calculation is performed for the decrypted encryption data. Then, the calculation result is encrypted and provided to the standard execution environment. Since the calculation process is performed for the decrypted encryption data (raw data), processing efficiency can be improved compared to the calculation using the homomorphic encryption or the like in which the calculation can be performed in the encrypted state. In addition, since the data is decrypted and the calculation process is performed in the virtual execution environment protected from the standard execution environment, the access from the unauthenticated user can be prevented and the security is ensured.

In addition, since the virtual execution environment is a one-time (disposable) execution environment which is discarded in a predetermined timing after the source code is executed, the risk of the illegal acquisition of the encryption key is reduced by preventing the attack to the OS which is the virtual execution environment and the security can be improved. In addition, since the construction of the virtual execution environment of the present embodiment can be achieved only by a software technology, additional hardware is not required and the operation cost can be reduced.

Variation Example of First Embodiment

The above described source code 118 used for the calculation executed on the calculation server 100 can be a calculation algorithm for speeding up the secure computing process. The source code execution unit 134 can, for example, perform comparison operations or the like of the key data for the decrypted encryption data 117 and generate the data in which the conditional branch destination for the data analysis is determined or the data in which the sorting or the like is performed as the calculation result. Namely, in the secure computing process which requires a large processing time when calculated in a state that encrypted by the homomorphic encryption or the like, the speed of the process is accelerated by decrypting the encryption data in the virtual execution environment for performing the calculation.

In addition, the source code 118 can be a cryptographic algorithm. For example, the storage unit 116 stores a cryptograph library as the source code 118, and the source code execution unit 134 encrypts the decrypted encryption data 117 by using arbitrary other encryption method (encryption method different from the encryption method used in the encryption data 117). Namely, the encryption method of the encryption data 117 is converted.

In addition, the calculation server 100 can be functioned as a proxy server. For example, the virtual execution environment is constructed and discarded in accordance with the increment and decrement of the communication amount. Thus, the security can be secured for the purpose of the ciphering gateway. In addition, the access control can be efficiently performed.

Example 2

A calculation server 400 concerning the present embodiment is different from the calculation server 100 of the first embodiment in the point that a detection unit for detecting an illegal access to the virtual execution environment is provided.

Figure 8:
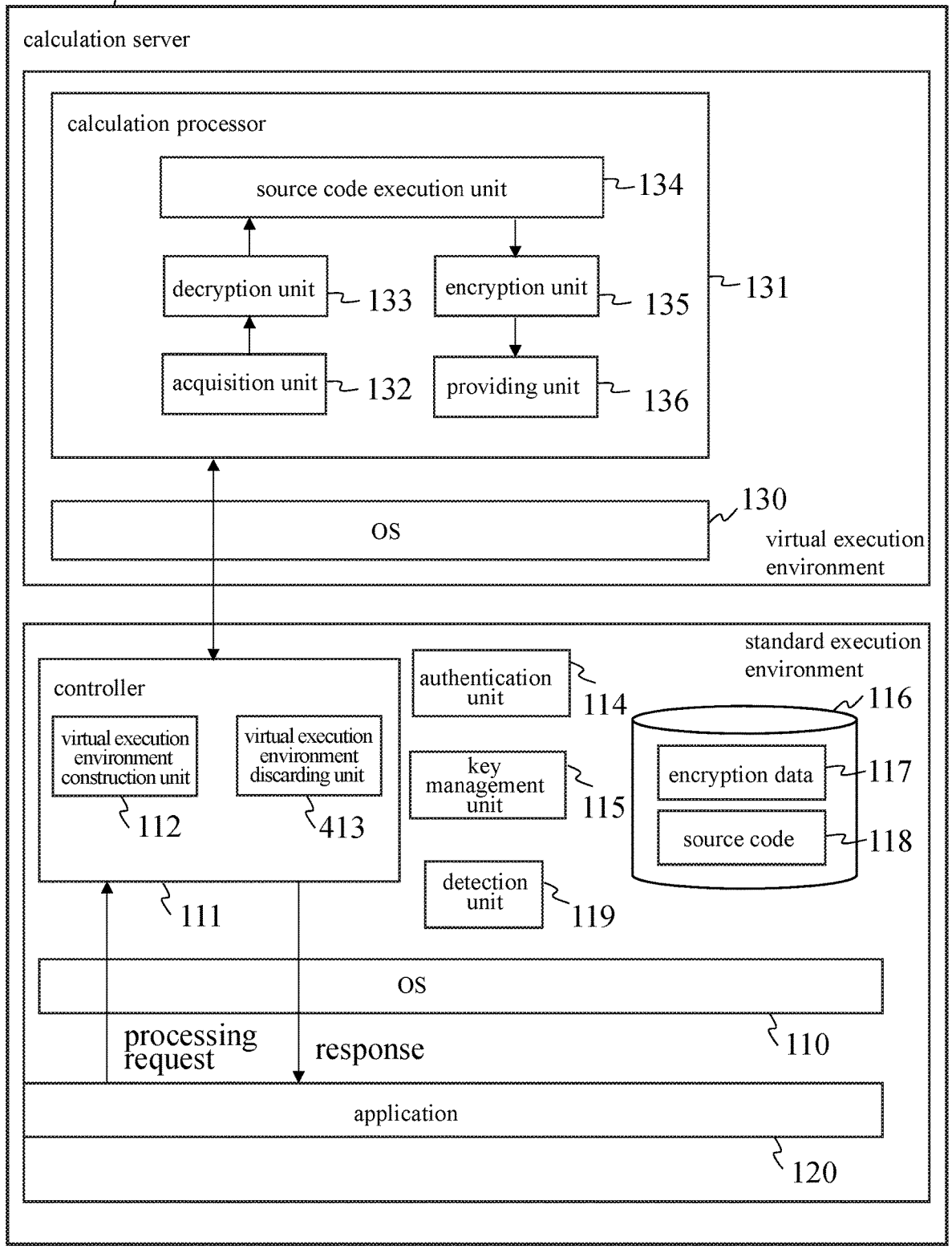
FIG. 8 is a functional block diagram showing an example of a function configuration of a calculation server 400.

FIG. 8 is a functional block diagram showing an example of the function configuration of the calculation server 400. The calculation server 400 is different from the calculation server 100 of the first embodiment shown in FIG. 2 in the point that a detection unit 119 is provided and a virtual execution environment discarding unit 413 is provided instead of the virtual execution environment discarding unit 113. Hence, the explanation of the common configuration will be omitted.

The OS 110 has the detection unit 119 for detecting an illegal access to the virtual execution environment. The detection unit 119 is, for example, a program operated on the OS 110. The detection unit 119 can detect the access request for writing or deleting various resources (e.g., file, registry, kernel data structure) required for operating the programs or the like on the OS 110 as the illegal access. In addition, the detection unit 119 can detect, for example, the hacking of the user account, the access from the different IP address, attempt for the ID or the authentication information exceeding a predetermined number of times within a predetermined period, and the interruption of the program not designated by the user as the illegal access. The illegal access can be detected by using the conventionally known technologies without being limited to the above described examples. When the detection unit 119 detects the illegal access, the detection unit 119 notifies the existence of the illegal access to the virtual execution environment discarding unit 413.

The virtual execution environment discarding unit 413 discards the virtual execution environment when (based on the fact that) the detection unit 119 detects the illegal access. Since the virtual execution environment is discarded when the illegal access to the virtual execution environment is detected, the decrypted encryption data is prevented from being illegally acquired. Thus, the security can be improved.

The above described embodiments can be carried out in other various forms. Various omission, replacement and change can be applied within the range not deviating from the summary of the present invention. The embodiments and the variation of them are included in the range and summary of the present invention and also included in the invention described in the claims and the range equivalent to them.

DESCRIPTION OF THE REFERENCE NUMERALS

1: information processing system; 100, 400: calculation server; 200: registration server; 300: terminal; 110,130: OS, 111: controller, 112: virtual execution environment construction unit; 113, 413: virtual execution environment discarding unit; 114: authentication unit; 115: key management unit, 116: storage unit; 117: encryption data; 118: source code; 119: detection unit; 120: application; 131: calculation processor; 132: acquisition unit; 133: decryption unit; 134: source code execution unit; 135: encryption unit; 136: providing unit; 201: ID generating unit; 202: authentication information generating unit

The invention claimed is:

1. A calculation device for performing a calculation for an encryption data encrypted by a system key associated with a user in a virtual execution environment protected from a standard execution environment, the virtual execution environment being accessed only by an authenticated user, the calculation device comprising:
  a storage unit for storing the encryption data and a source code for performing a calculation algorithm for the encryption data; and
  a controller that performs the calculation algorithm by receiving a calculation processing request for the encryption data,
  the controller includes:
  a key management unit for storing the user and the system key in a key database in association with each other;
  a virtual execution environment construction unit for constructing the virtual execution environment in the calculation device in accordance with the calculation processing request for the encryption data,
  an encryption data acquisition unit for acquiring the encryption data from the storage unit in the virtual execution environment;
  a source code acquisition unit for acquiring the source code from the storage unit in the virtual execution environment;
  a key acquisition unit for acquiring the system key from the key database in the virtual execution environment;
  a decryption unit for decrypting the encryption data by the acquired system key in the virtual execution environment;
  a source code execution unit for performing the calculation algorithm for the encryption data by the source code of the program in the virtual execution environment;
  a key generation unit for generating a different system key which is different from the system key in the virtual execution environment;
  an encryption unit for encrypting a calculation result to which the calculation algorithm is performed, the calculation result being encrypted by the different system key generated by the key generation unit in the virtual execution environment; and
  a calculation result providing unit for providing the encrypted calculation result encrypted in the virtual execution environment from the virtual execution environment to the standard execution environment.

2. The calculation device according to claim 1, the calculation device further comprising:

a virtual execution environment discarding unit for discarding the virtual execution environment.

3. The calculation device according to claim 2, wherein the virtual execution environment discarding unit discards the virtual execution environment when a predetermined time elapses after the source code execution unit starts executing the source code.

4. The calculation device according to claim 2, wherein the virtual execution environment discarding unit discards the virtual execution environment after the encrypted calculation result is provided.

5. The calculation device according to claim 2, the calculation device further comprising:
an authentication unit for authenticating whether or not the user is a secure user who can securely access the virtual execution environment, wherein
the virtual execution environment discarding unit discards the virtual execution environment in accordance with an instruction from the user authenticated by the authentication unit.

6. The calculation device according to claim 2, the calculation device further comprising:
a detection unit for detecting an illegal access to the virtual execution environment, wherein
the virtual execution environment discarding unit discards the virtual execution environment when the detection unit detects the illegal access to the virtual execution environment.

7. The calculation device according to claim 1, wherein the virtual execution environment includes a virtual execution environment discarding unit for discarding the virtual execution environment.

8. The calculation device according to claim 1, wherein the source code is an algorithm for generating a learning model based on the encryption data.

9. A calculation system for performing a calculation for an encryption data encrypted in an external terminal by a system key in a virtual execution environment protected from a standard execution environment, the virtual execution environment being accessed only by an authenticated user, the calculation system comprising:
a storage unit for storing the encryption data and a source code for performing a calculation algorithm for the encryption data; and
a controller that performs the calculation algorithm by receiving a calculation processing request for the encryption data,
the controller includes:
a key management unit for storing a user and the system key in a key database in association with each other;
a virtual execution environment construction unit for constructing the virtual execution environment in the calculation device in accordance with the calculation processing request for the encryption data,
an encryption data acquisition unit for acquiring the encryption data from the storage unit in the virtual execution environment;
a source code acquisition unit for acquiring the source code from the storage unit in the virtual execution environment;
a key acquisition unit for acquiring the system key from the key database in the virtual execution environment;
a decryption unit for decrypting the encryption data by the acquired system key in the virtual execution environment;

a source code execution unit for performing the calculation algorithm for the encryption data by the source code of the program in the virtual execution environment;
a key generation unit for generating a different system key which is different from the system key in the virtual execution environment;
an encryption unit for encrypting a calculation result to which the calculation algorithm is performed, the calculation result being encrypted by the different system key generated by the key generation unit in the virtual execution environment; and
a calculation result providing unit for providing the encrypted calculation result encrypted in the virtual execution environment from the virtual execution environment to the standard execution environment.

10. A calculation method for performing a calculation for an encryption data encrypted by a system key associated with a user in a virtual execution environment protected from a standard execution environment, the virtual execution environment being accessed only by an authenticated user, wherein
the calculation method is executed by a computer having a storage unit for storing the encryption data and a source code for performing a calculation algorithm for the encryption data and a controller that performs the calculation algorithm by receiving a calculation processing request for the encryption data,
the calculation method comprising:
a step of storing the user and the system key in association with each other in a key database of the storage unit;
a step of constructing the virtual execution environment in the calculation device by the controller in accordance with the calculation processing request for the encryption data
a step of acquiring the encryption data from the storage unit in the virtual execution environment;
a step of acquiring the source code from the storage unit in the virtual execution environment;
a step of acquiring the system key from the key database in the virtual execution environment;
a step of decrypting the encryption data by the acquired system key in the virtual execution environment;
a step of performing the calculation algorithm for the encryption data by the source code of the program in the virtual execution environment;
a step of generating a different system key which is different from the system key in the virtual execution environment;
a step of encrypting a calculation result to which the calculation algorithm is performed, the calculation result being encrypted by the different system key generated by the key generation unit in the virtual execution environment; and
a step of providing the encrypted calculation result encrypted in the virtual execution environment from the virtual execution environment to the standard execution environment.

11. A non-transitory computer readable medium having stored thereon a calculation program for making a processor execute a calculation method for performing a calculation for an encryption data encrypted by a system key associated with a user in a virtual execution environment protected from a standard execution environment, the virtual execution environment being accessed only by an authenticated user, wherein the calculation method is executed by a computer having a storage unit for storing the encryption data and a source code for performing a calculation algorithm for the encryption data and a controller that performs the calculation algorithm by receiving a calculation processing request for the encryption data, the calculation method comprising:

a step of storing the user and the system key in association with each other in a key database of the storage unit;

a step of constructing the virtual execution environment in the calculation device by the controller in accordance with the calculation processing request for the encryption data a step of acquiring the encryption data from the storage unit in the virtual execution environment;

a step of acquiring the source code from the storage unit in the virtual execution environment;

a step of acquiring the system key from the key database in the virtual execution environment;

a step of decrypting the encryption data by the acquired system key in the virtual execution environment;

a step of performing the calculation algorithm for the encryption data by the source code of the program in the virtual execution environment;

a step of generating a different system key which is different from the system key in the virtual execution environment;

a step of encrypting a calculation result to which the calculation algorithm is performed, the calculation result being encrypted by the different system key generated by the key generation unit in the virtual execution environment; and a step of providing the encrypted calculation result encrypted in the virtual execution environment from the virtual execution environment to the standard execution environment.

* * * * *